United States Patent
Won et al.

(10) Patent No.: US 7,474,364 B2
(45) Date of Patent: Jan. 6, 2009

(54) STRUCTURE FOR MOUNTING AN INVERTER

(75) Inventors: Se Chang Won, Kyonggi-do (KR); Myong Gi Jang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/026,482

(22) Filed: Dec. 27, 2001

(65) Prior Publication Data

US 2002/0195923 A1   Dec. 26, 2002

(30) Foreign Application Priority Data

Jun. 20, 2001   (KR) ............................... 2001-35091

(51) Int. Cl.
  G02F 1/1333 (2006.01)
  G02F 1/1335 (2006.01)
  G02F 1/1345 (2006.01)
(52) U.S. Cl. .......................................... 349/58; 349/61
(58) Field of Classification Search .................. 349/50, 349/57, 56, 67, 65, 58, 149, 150, 151, 152, 349/110, 11, 61, 62; 345/87, 905; 313/498, 313/493, 681, 682, 683; 361/681, 682, 687
See application file for complete search history.

(56) References Cited

U.S. PATENT DOCUMENTS

| | | | | |
|---|---|---|---|---|
| 5,898,567 A * | 4/1999 | Satake | ......................... | 361/687 |
| 6,020,867 A * | 2/2000 | Shimada et al. | ............... | 345/87 |
| 6,024,335 A * | 2/2000 | Min | ............................ | 248/371 |
| 6,330,150 B1 * | 12/2001 | Kim | ............................ | 361/683 |
| 6,426,784 B1 * | 7/2002 | Sakai et al. | .................... | 349/58 |
| 6,466,282 B2 * | 10/2002 | Sasuga et al. | .................. | 349/58 |
| 6,587,166 B1 * | 7/2003 | Lee et al. | ....................... | 349/58 |
| 2001/0035711 A1 * | 11/2001 | Itoh | ............................ | 313/493 |

FOREIGN PATENT DOCUMENTS

| | | | |
|---|---|---|---|
| JP | 05-053099 A | | 3/1993 |
| JP | 06-160813 | | 6/1994 |
| JP | 11086623 | * | 3/1999 |
| JP | 2000-092415 A | | 3/2000 |
| JP | 2000-214441 | | 8/2000 |
| JP | 2000-214441 A | | 8/2000 |
| JP | 2001-083486 | | 3/2001 |

* cited by examiner

Primary Examiner—Thomas L Dickey
Assistant Examiner—Fazli Erdem
(74) Attorney, Agent, or Firm—McKenna Long & Aldridge LLP

(57) ABSTRACT

Thus, the mounting position and fixing structure of an inverter in an LCD is improved for effective use of a system housing space of a notebook computer and the like. A structure for mounting an inverter in an LCD having a liquid crystal display module for presenting a picture is provided. The inverter is connected to a lamp in a display module for supplying a required power to the lamp. At least one bracket is fitted to a bottom surface of outside of a case of the display module for fixing the inverter to the bracket.

3 Claims, 4 Drawing Sheets

STRUCTURE FOR MOUNTING AN INVERTER

This application claims the benefit of Korean Patent Application No. 2001-35091, filed on Jun. 20, 2001, the entirety of which is hereby incorporated by reference for all purposes as if fully set forth herein.

BACKGROUND OF THE INVENTION

1. Field of the Invention

The present invention relates to an inverter in a liquid crystal display (LCD), and more particularly to an improved mounting position and fixing structure of inverter in an LCD which provides effective use of a system housing space of a notebook computer, and the like.

2. Background of the Related Art

Generally video presenting systems include notebook computers, monitors, TV receivers, and the like. Referring to FIG. 1, for an example, a notebook computer is provided with a body 10 having input-output-operation devices built-in therein, and a system housing 30 having an LCD 20 and fitted to the body by a hinge part 31 projecting from a lower end of the system housing 30, and, though not shown, a lower part of the monitor, or the TV receiver, is projected to some extent for fitting a control parts.

Though not shown, the LCD in the system housing 30 is, as known in the art, provided with a flat display module. The flat display module including at least a back light part for emitting light by a lamp, a liquid crystal panel part (or display part) in front of the back light part for presenting a picture or video by utilizing the light received from the back light part. In addition, the notebook computer system housing 30 includes a frame for supporting edges of the flat display module which maintains a required gap between the back light part and the LCD panel part and a case for putting the display module and the frame together. A picture or video is reproduced by using molecular movement of the liquid crystal in the liquid display panel part to allow preselected light to be displayed.

A related art structure for mounting an inverter in an LCD will be explained, with reference to the foregoing description.

Referring to FIG. 2, an inverter 21 for receiving utility power, converting the utility power to power required for the lamp, and supplying the power to the lamp (not shown) in the LCD 20, may be fitted to a rear case of the LCD 20, or, though not shown, on an inside surface of the system housing 30.

However, one problem associated with the related art is that the fitting of the inverter 21 either to a rear surface of the case of the LCD 20 or to an inside surface of the system housing 30 requires the LCD or the system housing to be thicker. Which is contrary to the current need for thinner and lighter display instruments.

SUMMARY OF THE INVENTION

The present invention is directed to a structure for mounting an inverter in an LCD that substantially obviates one or more of the problems of the related art.

An advantage of the present invention is to provide a structure for mounting an inverter in an LCD, in which mounting position and fixing structure of the inverter are improved to minimize the system housing space of a notebook computer.

Additional features and advantages of the invention will be set forth in the description which follows, and in part will be apparent from the description, or may be learned by practice of the invention. These advantages and other advantages of the invention will be realized and attained by the structure particularly pointed out in the written description and claims hereof as well as the appended drawings.

To achieve these and other advantages and in accordance with a purpose of the present invention, as embodied and broadly described, in the structure for mounting an inverter in an LCD having a liquid crystal display module for presenting a picture the inverter is connected to a lamp in a display module for supplying a required power to the lamp and a case is used for fixing the display module. The case includes at least one bracket fitted to a bottom surface of the case for fixing the inverter to the bracket.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Parts of the present invention similar to the related art will be given the same reference symbols.

Figure 3A:
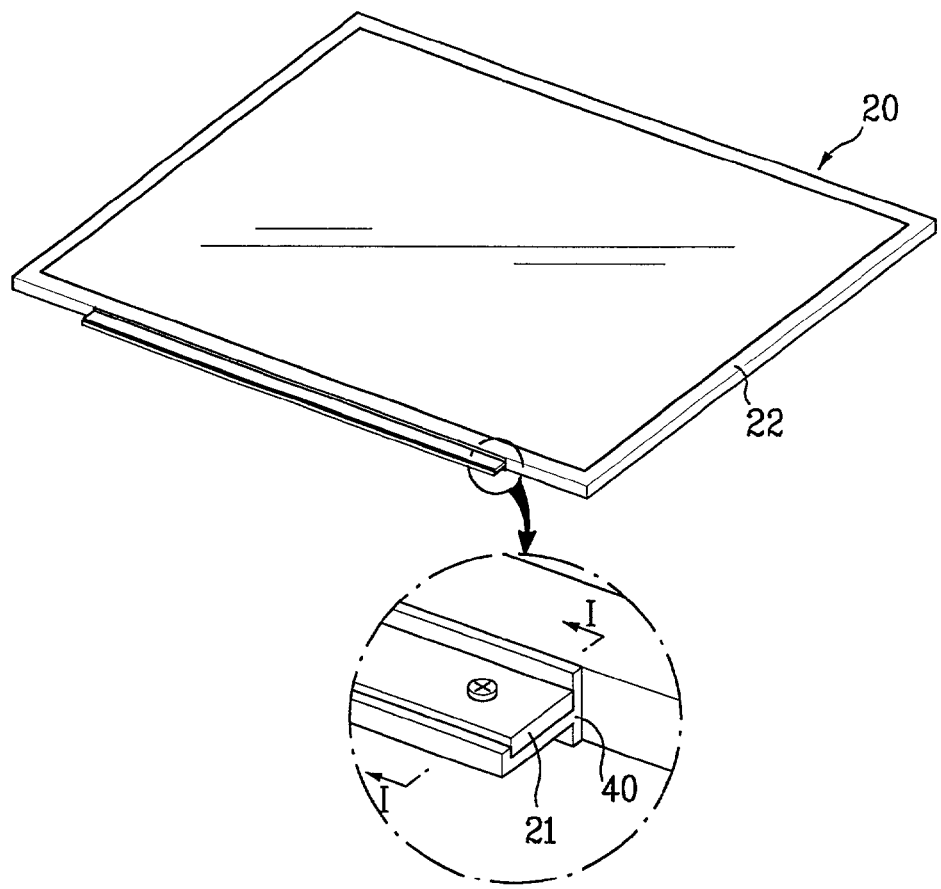
FIG. 3A illustrates a perspective view showing a structure for mounting an inverter in an LCD in accordance with a first embodiment of the present invention.
Figure 3B:
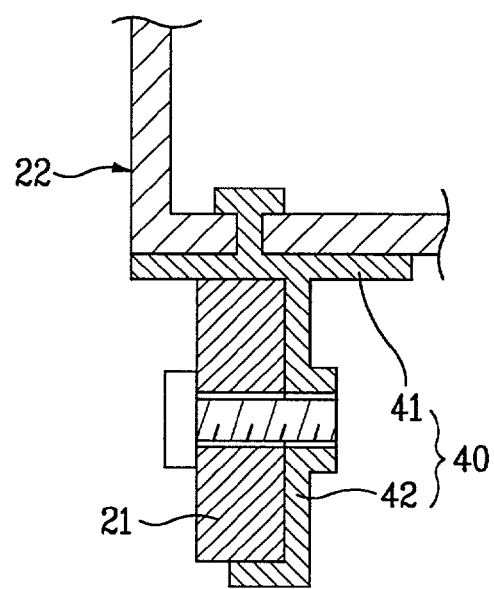
FIG. 3B illustrates a section across a line I-I in FIG. 3A.

Referring to FIGS. 3A and 3B, the structure for mounting an inverter in an LCD 20 in which the inverter 21 is connected to a lamp in a display module for supplying a required power to the lamp is shown. A case 22 for fixing the display module in accordance with a first preferred embodiment of the present invention includes a bracket 40 fitted to a bottom surface of outside of the case 22 for fixing the inverter 21 to the bracket.

Figure 1:
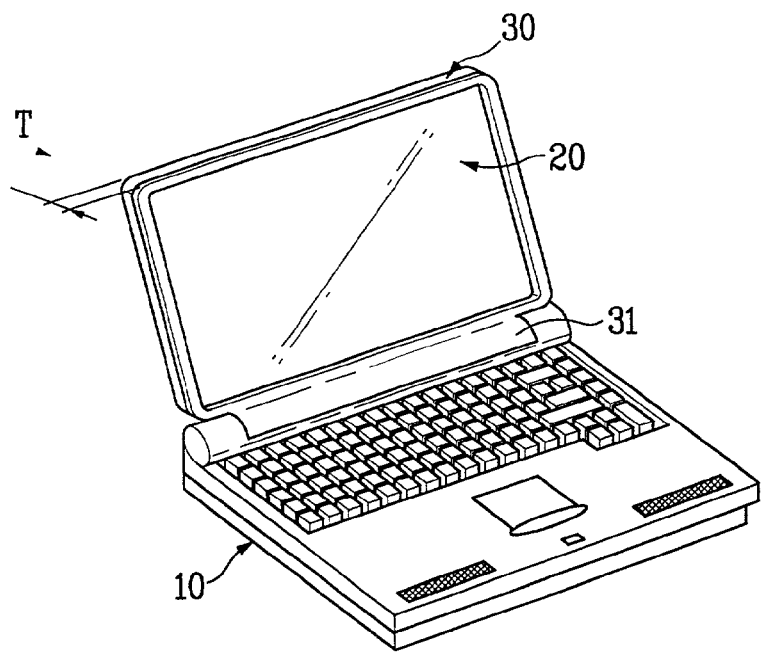
FIG. 1 illustrates a perspective view of a related art notebook computer.
Figure 2:
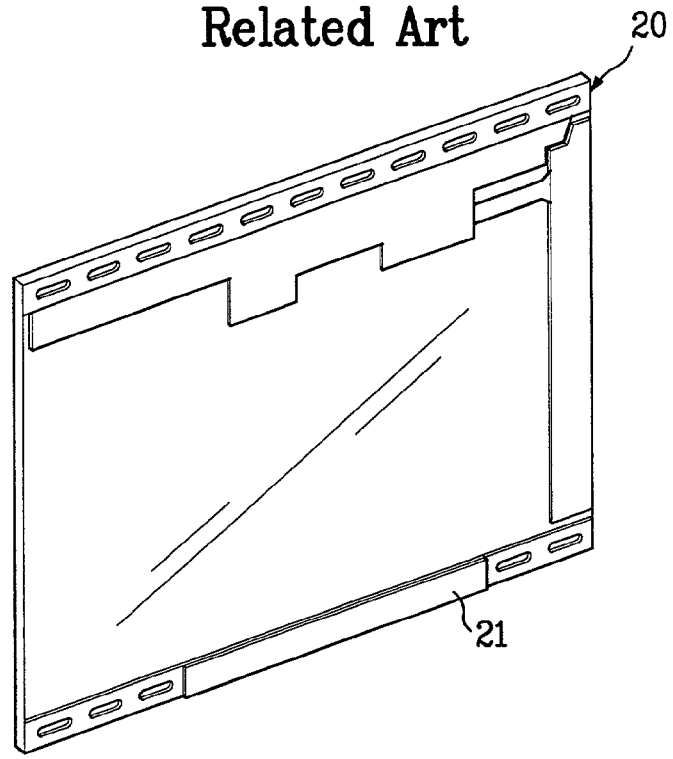
FIG. 2 illustrates a section showing a related art structure for mounting an inverter in an LCD.

Referring to FIG. 3B, the bracket 40 includes a case part 41 parallel to the bottom surface of the case 22 and an inverter part 42 parallel to a front surface of the case 22. In one embodiment the inverter part 42 is positioned at a center of the case part 41 for preventing the inverter 21 fitted to the inverter part 42 of the bracket from extending to the front or rear surface of the case 22 thereby preventing the LCD 20 from being made thicker due to the position of the inverter 21. For example, as the foregoing structure permits fitting the inverter 21 in a space of the hinge part 31 of the system housing 30, as shown in FIG. 1, the system housing can be made thinner.

Accordingly, an improved system is shown wherein the system housing space of a notebook computer and the like are minimized.

Figure 4A:
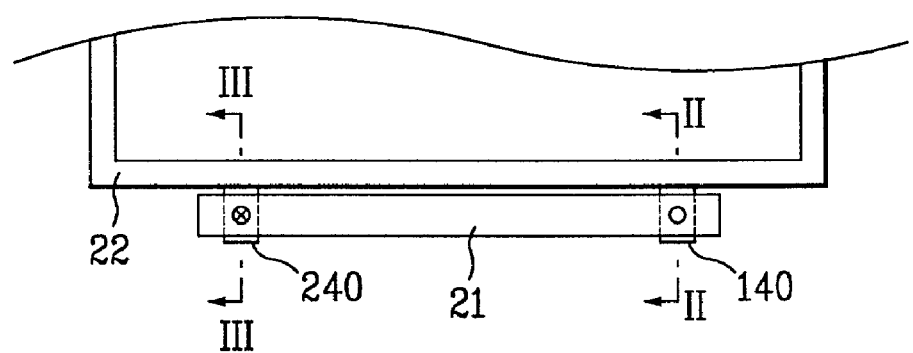
FIG. 4A illustrates a plan view of key parts showing a structure for mounting an inverter in an LCD in accordance with a second embodiment of the present invention.

In another embodiment, there may be more than one bracket 40 for supporting the inverter at both ends. As shown in detail in FIG. 4A, a first bracket 140 for supporting one end of the inverter 21 and a second bracket for supporting the other end of the inverter 21 may be provided.

Figure 4B:
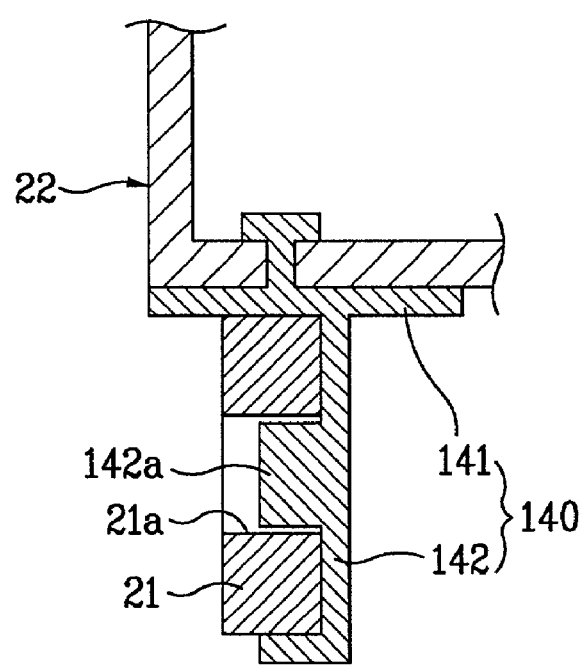
FIG. 4B illustrates a section across a line II-II in FIG. 4A.
Figure 4C:
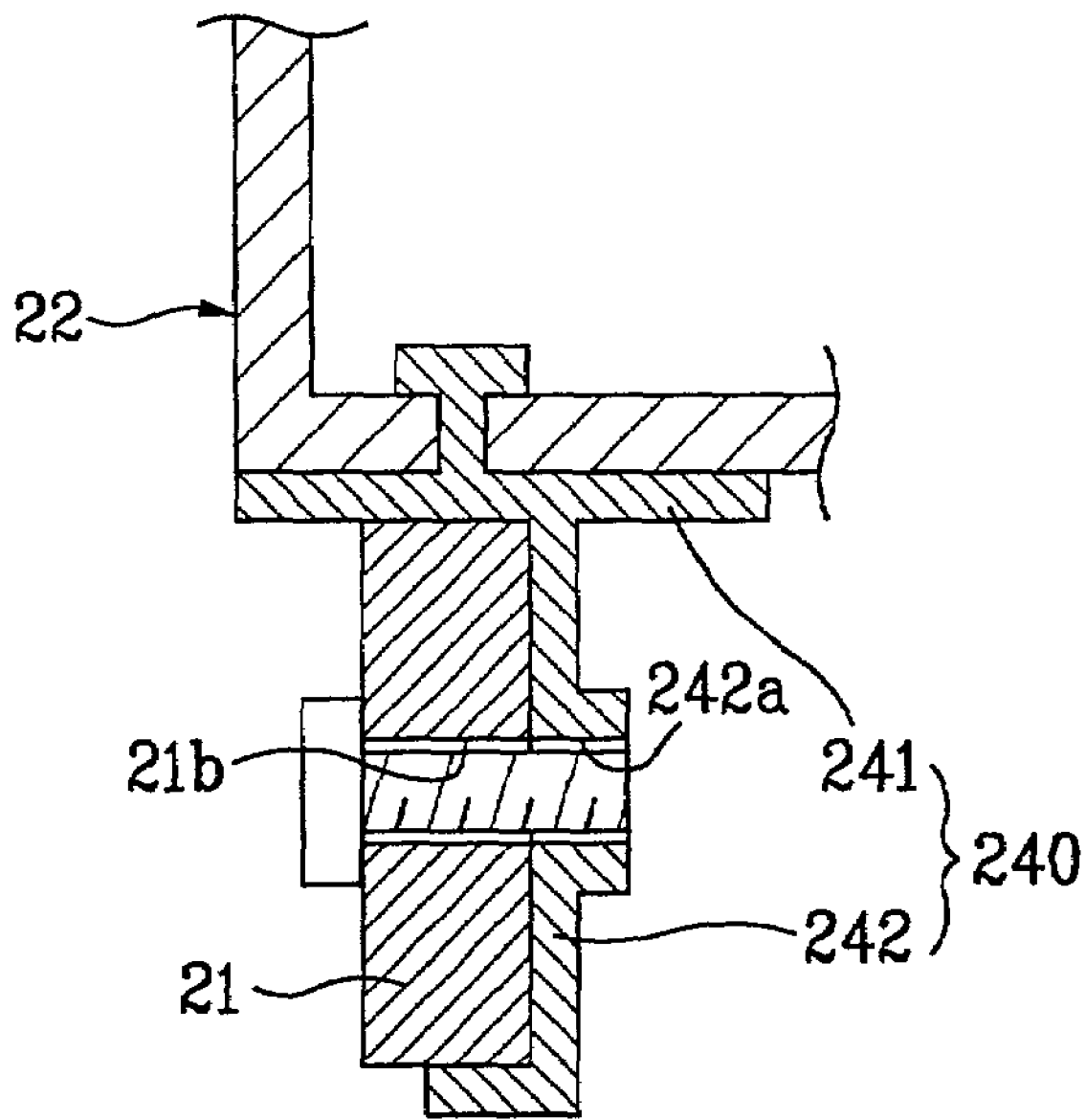
FIG. 4C illustrates a section across a line III-III in FIG. 4A.

The mounting of the inverter 21 on the first, and second brackets 140, and 240 will be explained with reference to FIGS. 4B, and 4C. FIG. 4B illustrated a cross-section of the first bracket along section line II-II' of FIG. 4A., i.e. the right bracket, as shown. FIG. 4C illustrates a cross-section of the second bracket, along section line III-III' of FIG. 4A, i.e. the left bracket, as shown.

Referring to FIG. 4B, there is a guide projection 142*a* extending from the inverter part 142 of the first bracket and a guide hole 21*a* at one end of the inverter 21 for inserting the guide projection therein. As shown in FIG. 4C, there are screw hole 242*a* in the inverter part 242 of the second bracket, and a coupling hole 21*b* at the other end of the inverter 21. Accordingly, the guide hole 21*a* in the inverter 21 is inserted in the guide projection 142*a* from the first bracket 140 and the coupling hole 21*b* in the inverter 21 is screw fastened at the screw hole 242*a* in the second bracket 240. At the end, the use of two brackets 140 and 240 improves a supporting force to the inverter 21, and ease of manufacture because one end of the inverter is inserted in the first bracket 140, and the other end of the inverter is screw fastened at the second bracket 240.

In another embodiment, not shown, one end of the bracket 40, 140, or 240 and the bottom surface of outside of the case 22 may be coupled in a variety of methods, for example, by a projection from one end of the bracket and a hole corresponding to the projection in the case for inserting the projection in the hole and punching the inserted part or by welding or double faced tape, or by any other appropriate method.

As previously discussed these structures for mounting an inverter in an LCD of the present invention has at least the following advantages.

First, the LCD or the system housing can be made thinner.

Second, the case of a metal enhances a ground effect.

Third, all the effects mentioned in the detailed description of the present invention are included.

It will be apparent to those skilled in the art that various modifications and variations can be made in the structure for mounting an inverter in an LCD of the present invention without departing from the spirit or scope of the invention. Thus, it is intended that the present invention cover the modifications and variations of this invention provided they come within the scope of the appended claims and their equivalents.

What is claimed is:

1. A structure for mounting an inverter for supplying power to a lamp in an liquid crystal display device having a liquid crystal display module, comprising:

an inverter electrically connected to a lamp;

a case surrounding the liquid crystal display module;

first and second brackets each having a case part and an inverter part, arranged on an external surface of the case for supporting both ends of the inverter;

a screw hole in the inverter part of the second bracket;

a guide projection extending from the inverter part of the first bracket;

a guide hole at an end of the inverter for inserting the guide projection therein;

a coupling hole at the other end of the inverter for fastening the inverter to the inverter part of the second bracket, and a screw for fastening the inverter to the inverter part of the first bracket through the coupling hole and the screw hole.

2. A structure according to claim 1, wherein each inverter part is parallel to a front surface of the case; and each inverter part is positioned at a center of the bottom surface of the case, thereby preventing the inverter on the inverter part from being projected above or below the front or rear surface of the case.

3. A structure according to claim 1, further comprising;

a system housing surrounding the case and the LCD module;

a body having input and output devices; and a hinge part for connecting the system housing to the body.

* * * * *